Patented Nov. 11, 1952

2,617,736

UNITED STATES PATENT OFFICE 2,617,736

PROCESS FOR PRODUCTION OF REFRACTORY SILICEOUS MATERIAL AND PRODUCTS THEREOF OR THEREWITH OBTAINED

Pietro Ciferri, Genoa, Italy

No Drawing. Application December 29, 1947, Serial No. 794,302. In Italy October 17, 1945

6 Claims. (Cl. 106—69)

The present invention relates to an industrial process for the production of refractory materials from natural materials containing about 98% silica and to the products obtained in accordance with the process.

I have discovered that a material possessing a very high percentage of silica, such as quartzite, Dinas stones, ganister, quartz sand, ground, if necessary by a heavy and rapid crusher, with about 25–35% of water without the presence of binding material for about an hour forms a mud which amalgamates, viz, becomes sticky and if allowed to "season" for approximately one month according to the ambient conditions, the amalgamating process continues, while the water percentage diminishes. If the paste is heated gradually (at 1000–1500° C.) it may reach the highest temperature, that is to say to the fusion point, without decomposition.

This is a phenomenon absolutely new inasmuch as it was previously believed that quartz products with a very high percentage of silica ($SiO_2$) could not amalgamate without binding material, viz, that either in contact with fire or in the dry state it would fall into dust.

Indeed, all the producers of refractory materials having a silica base add binding materials to the quartz with the noxious result of reducing its refractoriness sometimes even from 50 to 100° C. while the product obtained in accordance with the present invention may be heated to the highest temperatures attainable with siliceous refractory materials, even to 1200–1800° C. without modifying its structure and constitution.

The industrial process for producing the refractory material according to the present invention is characterised by the fact that a natural product as stated above, preferably having a very high percentage of silica ($SiO_2$) for instance 98%, is ground without binding material in a heavy and rapid crusher or in a ball mill with quartzite balls of a very high resistance quality. From 25 to 35% of water is added, and after about an hour of grinding a sort of mud is obtained which amalgamates, viz, becomes sticky; this mud is then stored in a silo for the "seasoning." During this period the paste loses some of its water and is transformed into a paste which can be then used for producing refractory material either for monolith or blocks production or for making bricks, by submitting said material to the action of heat. When making bricks additions up to about 50% of quartz in bits from the medium size of millet to the medium size of peas must be made after the seasoning and before making the bricks.

Moreover, it has been ascertained that the process can be advantageously carried out by using about 50% of crushed siliceous material or siliceous bricks recovered during the demolition of a furnace, the useful life of which has been exhausted, and grinding it with about 50% of pure quartzite, Dinas brick, ganister, quartz sands, as before mentioned, and predisposing the stamping of said mixture for a lining of a furnace. It is possible also, in accordance with known methods, to use binding materials having slight basic characteristics, like lime, iron oxide etc.

The industrial products in accordance with the present invention include refractory linings of furnaces or of any other installation or device or object intended to support very high temperatures like ladles, casting sleeves, heating elements, blocks of refractory materials and even bricks.

The process may be completed by subsidiary manipulations like gradual stamping of the mud or drier or absolutely dry paste by successive zones, immersion in bath or coating of graphite etc.

In order that the invention may be more clearly understood and readily carried into effect, the following example is given by way of illustration:

Pure quartzite is used having about 98% silica (the higher the percentage the more refractory the product will be) or another mineral or another natural product but in every case having a very high percentage of silica because impurities cause a strong reduction of the refractoriness of the product. This material, without any binder, is ground with a heavy and rapid crusher or in a ball mill whose balls consist of blocks of very resistant quartzite in order to prevent the pulverised quartz from becoming contaminated with ferrous-ferric-oxide. By using such a ball mill there will be a loss of material of the balls but the pulverised material will continue to be constituted by pure quartzite with a very high percentage of silica. During the grinding the moisture of the quartz must be prepared and maintained between 25 and 35%. After an hour or so of grinding, the paste begins to amalgamate, viz, it gets sticky; only a few minutes more are necessary in order to have the paste ready. It is then stored in a silo where it is kept for seasoning for not less than thirty days, thus obtaining besides a reduction in moisture and the transformation of the mud into a paste, improved amalgamation. With the mud or paste obtained, refractory linings or elements for refractory linings of any type suitable for resisting to temperatures up to 1800° C. may be produced.

What I claim is:

1. Process for the production of refractory materials which comprises mixing a naturally occurring material containing about 98% silica in pulverised form with 25% to 35% of water, grinding said material for about one hour in the absence of binding materials, to form a mud which will become sticky, subjecting said mud to seasoning for at least one month to cause further amalgamation and loss of water and the formation of a paste, subjecting said paste to the action of heat at about 1000° to 1500° C. to form a refractory material which will resist high temperatures without modification of its conformation and structure.

2. Process according to claim 1, wherein up to 50% of crushed material containing a high percentage of silica obtained from used linings or bricks of a furnace are added to the naturally occurring material.

3. Industrial product consisting of a refractory material obtained according to the process of claim 1.

4. Furnaces, installations, plants for thermal treatments for any industry, characterised by the fact that the refractory lining is made either in monolithic form or of blocks with the refractory material produced according to the process of claim 1.

5. Accessories for plants, installations or the like intended for resisting high temperatures, characterised by the fact that their refractory lining is made of the material produced by the process of claim 1.

6. Refractory blocks, bricks, and the like made of the material produced according to the process of claim 1.

PIETRO CIFERRI.

REFERENCES CITED

The following references are of record in the file of this patent:

UNITED STATES PATENTS

| Number | Name | Date |
|---|---|---|
| 136,083 | McAninch et al. | Feb. 18, 1873 |
| 202,637 | Earnshaw | Apr. 23, 1878 |
| 439,796 | Bottome | Nov. 4, 1890 |
| 701,707 | Gibson | June 3, 1902 |
| 1,791,591 | Caven | Feb. 10, 1931 |

FOREIGN PATENTS

| Number | Country | Date |
|---|---|---|
| 122,388 | Great Britain | 1919 |

OTHER REFERENCES

Searle: Refractory Materials, 1924, page 101.